INVENTOR.
Gerhard Siess
BY
*Frank J. Thompson*
ATTORNEY

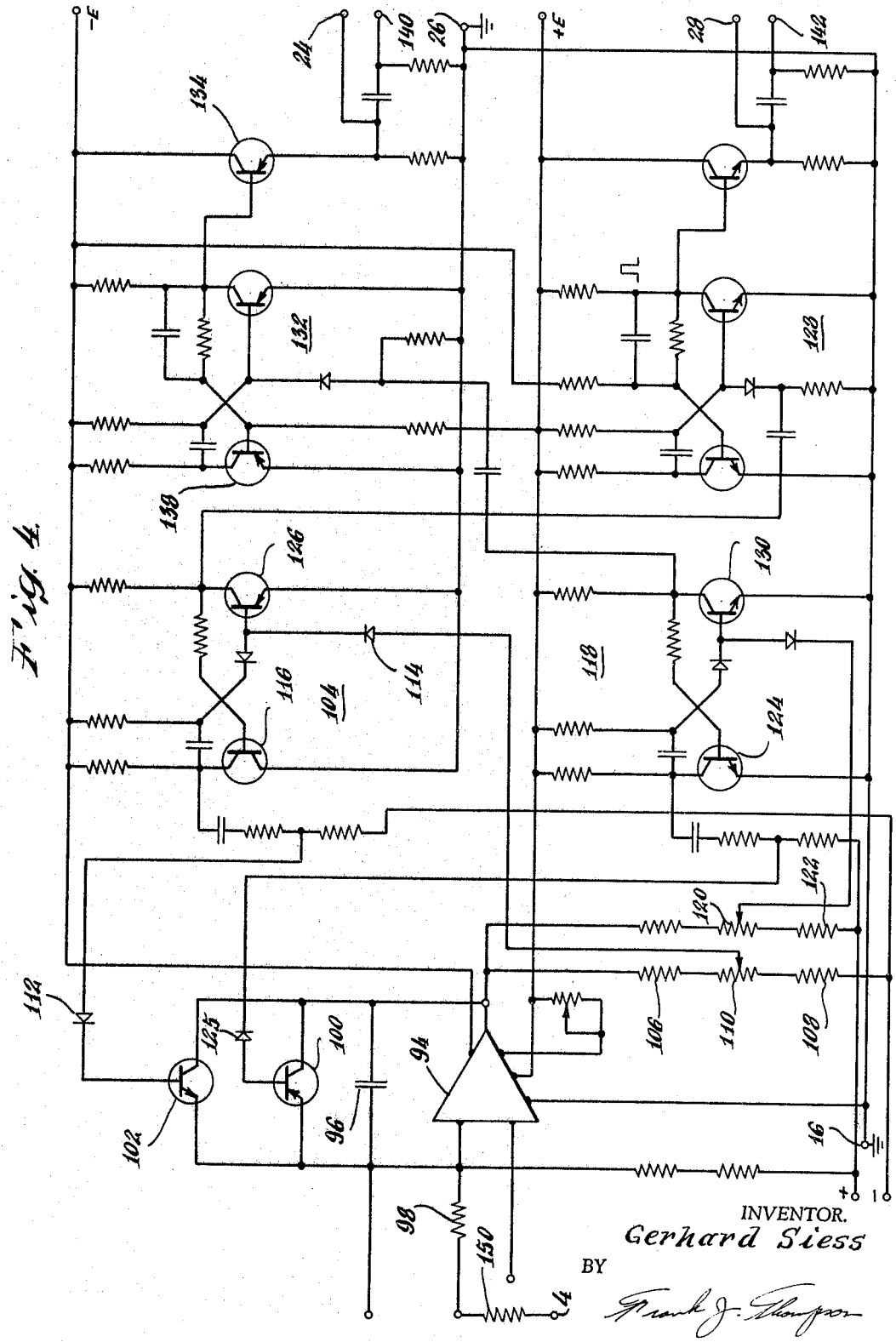

United States Patent Office 3,486,091
Patented Dec. 23, 1969

3,486,091
VOLTAGE-FREQUENCY-TRANSDUCER WITH A DEVICE FOR COMPENSATING ZERO LINE DRIFT
Gerhard Siess, Uberlingen (Bodensee), Germany, assignor to Bodenseewerk Perkin-Elmer & Co., G.m.b.H., Uberlingen (Bodensee), Germany, a corporation of Germany
Filed June 15, 1966, Ser. No. 557,772
Claims priority, application Germany, July 3, 1965, B 82,679
Int. Cl. H02p 1/54, 5/46
U.S. Cl. 318—18                     9 Claims

ABSTRACT OF THE DISCLOSURE

A voltage to frequency transducer is adapted to provide an output having a frequency and polarity indicative of the amplitude and polarity of the base line component of an input signal. Feed-back circuit means are coupled between output and input terminals of the transducer for providing, responsive to the transducer output during the interval between peaks, a compensating voltage having a polarity and a magnitude for reducing the amplitude of a base line component.

The present invention relates to voltage to frequency transducers. The invention relates more particularly to transducers of this type having means for correcting drift in the base line of an input signal.

Voltage to frequency transducers are employed in integrator arrangements for integrating a varying quantity over a period of time. A voltage representing the varying quantity is converted to a sequence of pulses having a frequency which varies with the amplitude of the voltage. These pulses are then applied to a counter for providing the integral of the voltage in digital form.

Integrators of this type find particular use with analytical apparatus such as gas chromatographs. The components of a gas mixture eluted from a separating column in a chromatographic apparatus provide detector output signals which are referred to as peaks. The peaks are bell shaped and occur successively in time. An area defined by the waveform of peaks is determined by converting the detector voltage to a pulse type signal having a frequency which is proportional to the amplitude of the detector voltage. These pulses are applied to a counter which indicates the sum of the pulses and thus the area of the peak waveform.

The output signal from a detector in a chromatographic apparatus includes, in addition to the bell shaped peak components, a base line component which occurs intermediate the peak components. Ideally, the base line component has a value of zero volts. However, for various reasons, the base line drifts and undesirably deviates from zero volts. The drift may result from variations in the characteristics and parameters of the electrical system or may result from a characteristic of the chromatographic system such as a programmed heating of a separating column in the apparatus. An error is thereby introduced into the determination of true peak area.

It is desirable to compensate for this base line drift and correction has been effected by superimposing a compensating correction voltage on the transducer signal during the interval between peaks. The correction voltage amplitude has been determined by the output frequency of the transducer during the interval between the occurrence of the peak components. In known arrangements, the correction has been effected to the extent that the output frequency of the transducer is reduced to the value of a few cycles between peaks. Nonetheless, it is relatively difficult to reduce the output to less than a few cycles and the base line is still subject to an error which can increase with time.

It is an object of the present invention to provide an improved voltage to frequency transducer having automatic compensation for base line drift.

In accordance with the present invention, a voltage to frequency transducer is adapted to provide an output having a frequency and polarity indicative of the amplitude and polarity of the base line component of an input signal. Feed-back circuit means are coupled between output and input terminals of the transducer for providing, responsive to the transducer output during the interval between peaks, a compensating voltage having a polarity and a magnitude for reducing the amplitude of a base line component.

In one embodiment of the invention, a compensating correction voltage is derived from a potentiometer having a motor driven wiper arm. The motor, which is a stepping motor, is excited by means including a forward and backward stepping counter and rotates in a first direction in accordance with forward stepping of the counter and in an opposite direction in accordance with backward stepping of the counter. A transducer provides output signals causing the counter to step in opposite directions in accordance with the polarity of an input signal.

These and other objects of the invention will become clear with reference to the following specifications and the drawings wherein:

FIGURE 4 is a schematic circuit diagram of a voltage to frequency transducer of FIGURE 1.

Figure 1:
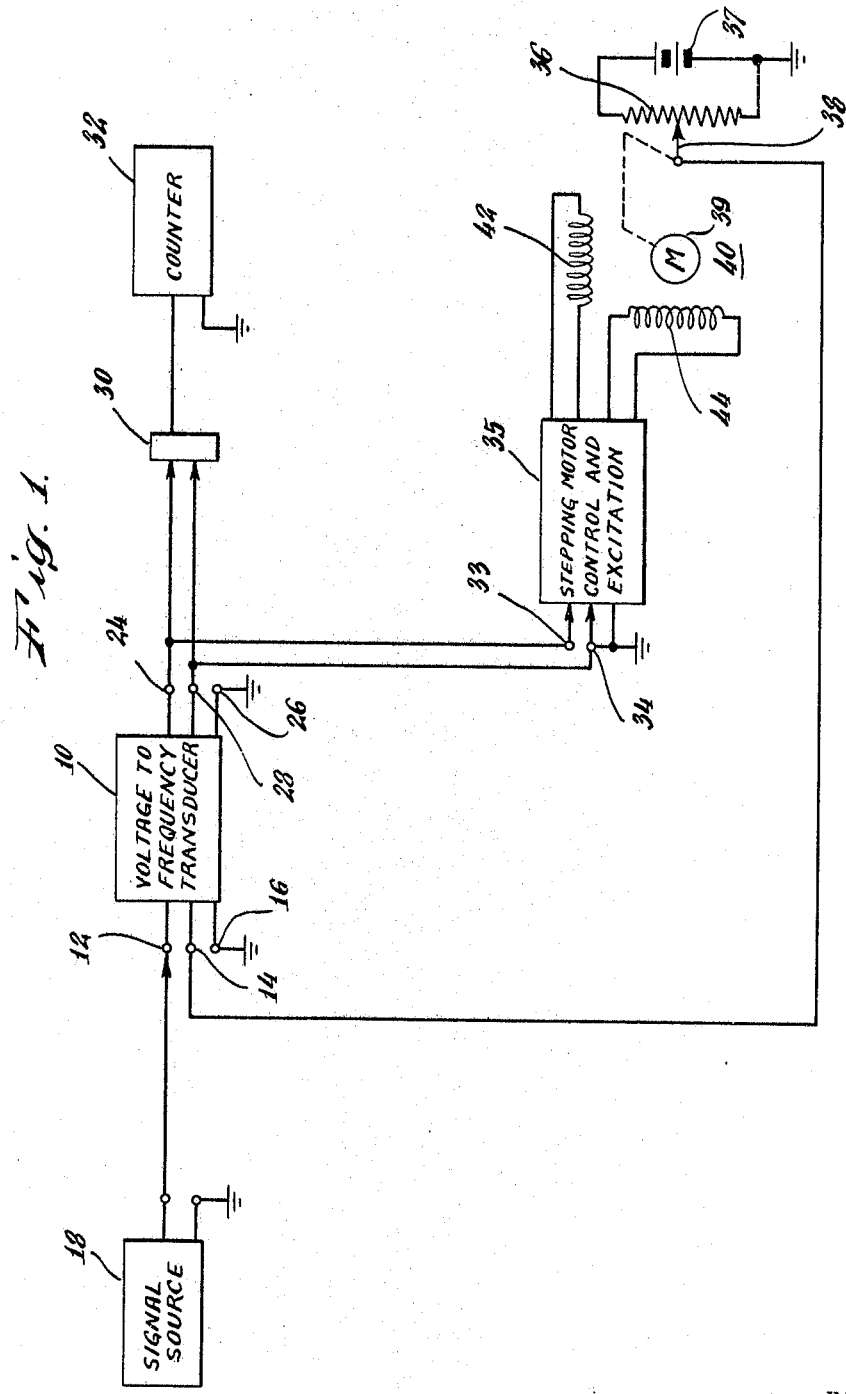
FIGURE 1 is a block diagram of an integrator circuit arrangement incorporating features of the present invention.
Figure 2:
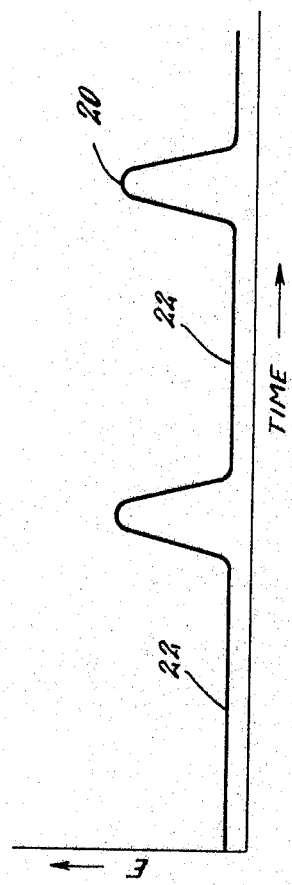
FIGURE 2 is a diagram of an input signal waveform to a transducer of FIGURE 1.

Referring now to FIGURE 1, an integrator is shown including a voltage to frequency transducer 10 having input terminals 12 and 14 and a common input terminal 16. An input signal (FIGURE 2) from a source 18, which is a detector in an analytical apparatus, is applied between terminals 12 and 16 of the transducer. The input signal includes generally bell shaped components 20 separated by base line components 22.

The transducer 10 is adapted to provide output pulses indicative of the amplitude and polarity of the input signal. Output voltages in the arrangement shown will occur between terminals 24 and 26 of the transducer 10 and between terminals 28 and 26 of the transducer in accordance with the polarity of the input signal. For example, a positive input signal will cause pulses to occur at terminal 24 having a frequency varying in accordance with the amplitude of the input signal. Similarly, a negative input signal, such as may occur when the base line component drifts negative, will cause pulses to occur at terminal 28. These pulses will have a frequency varying in accordance with the amplitude of the input signal. The output pulses at terminals 24 and 28 are coupled via an isolation network 30 to a counter 32 which provides the sum of the pulses and thus an indication of the area of the peaks. Isolation network 30 comprises a conventional resistive or diode network for coupling pulses to the counter while isolating the terminals 24 and 28.

In order to compensate for base line drift and in accordance with a feature of this invention, the output pulses from the transducer are coupled to terminals 33 and 34 of a motor control and excitation means 35 in a base line correction means. The correction means further includes a potentiometer 36 to which a potential is applied from a source 37. A slider contact arm 38 of the potentiometer 36 is electrically coupled to input terminal 14 of the transducer 10 and is mechanically coupled to a rotor 39 of a stepping motor, indicated generally as 40. Windings 42 and 44 of the motor are excited by the control and excitation means 35 in a manner for moving the potentiometer wiper arm 38 in a first direction and for an amount in accordance with the frequency of the output pulses at terminal 24. Similarly, the wiper arm is moved in an opposite direction and for an amount in accordance with the frequency of the output pulses at terminal 28. A correction voltage which is derived from the potentiometer is combined with the input signal at terminal 12. A feedback loop is thus provided which corrects base line drift to a relatively high degree of accuracy.

Figure 3:
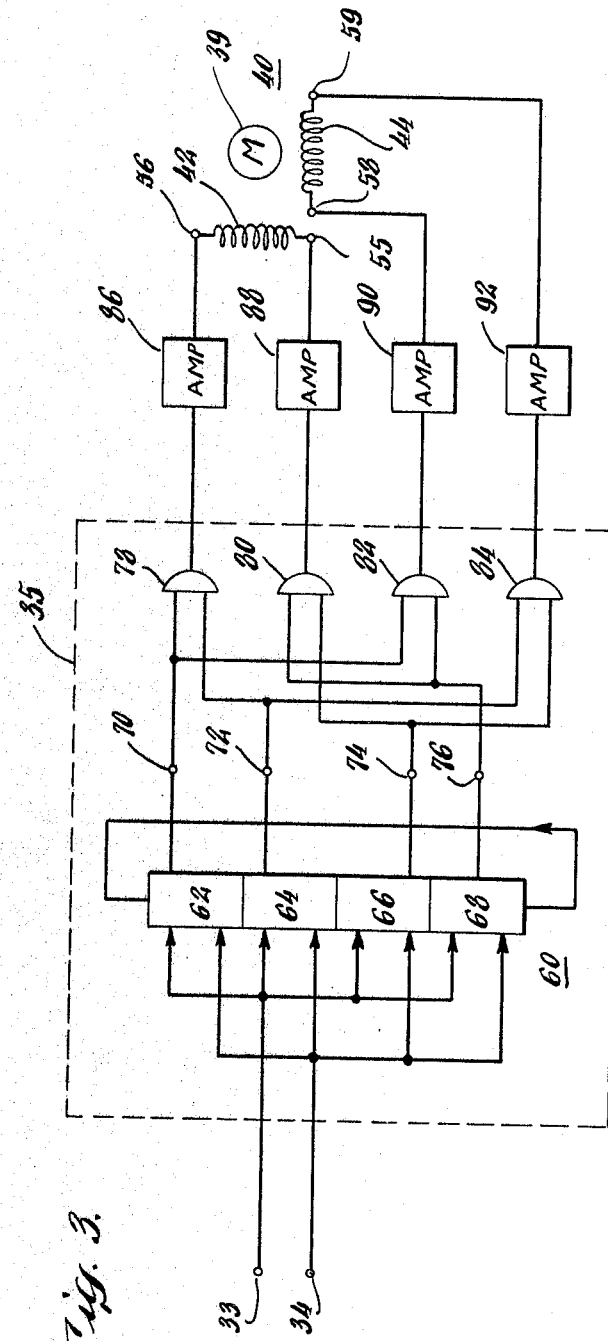
FIGURE 3 is a block diagram of an arrangement for controlling a stepping motor responsive to the output of a voltage to frequency transducer of FIGURE 1.

The arrangement of the stepping motor 40 and the motor control and excitation means 35 is shown in more detail in FIGURE 3. The stepping motor is of the permanent magnet (PM) type. This motor, which is well known, is adapted for stepping in angular increments in a clockwise or counterclockwise direction when voltages of a particular sequence and polarity are applied to terminals 55 and 56 of winding 42 and terminals 58 and 59 of winding 44. A stepping motor of this type is described in "Theory and Operation of Step-Servo Motors," Electrical Design News, July 1963.

In order to cause rotation of the rotor 39 in one direction, as for example in a clockwise direction, DC voltages having relative polarities and occurring in a programmed sequence are applied to the terminals of the windings as indicated by Table 1.

TABLE 1

| Sequence | 56 | 55 | 58 | 59 |
|---|---|---|---|---|
| 1 | + | − | + | − |
| 2 | + | − | − | + |
| 3 | − | + | − | + |
| 4 | − | + | + | − |
| 1 | + | − | + | − |
| 2 etc. | + | − | − | + |

While the application of voltages of the indicated relative polarities in the sequence 1, 2, 3, 4; 1, 2 etc. will cause clockwise rotation of the rotor, the application of voltages in the reverse sequence of time, i.e., 4, 3, 2, 1; 4, 3 etc. will cause counterclockwise rotation of the rotor.

Signals from the transducer 10 are coupled to input terminals 33 and 34 of a ring counter identified generally as 60.

The ring counter 60 is adapted for counting forward when pulses are applied to terminal 33 and backward when pulses are applied to terminal 34. The counter shown is adapted for responding to pulses of the same polarity at terminals 33 and 34. When the pulses at terminals 24 and 28 are of opposite polarities, an intermediate inverting amplifier is employed for providing pulses of the same polarity at terminals 33 and 34. The counter alternatively can be arranged to count in opposite directions when pulses of opposite polarities are applied to terminals 33 and 34. When the transducer 10 provides at a single output terminal, pulses of opposite polarity corresponding to the input signal polarity, then a conventional pulse steering stage can be employed for operating the pulses of opposite polarity. A pulse steering stage not shown comprises a diode circuit arranged for coupling positive pulses to terminal 33, for example, while presenting high impedance to the pulses at terminal 34 and for coupling negative pulses to terminal 34 while presenting high impedance to the pulses at terminal 33.

The ring counter 60 includes four stages 62, 64, 66 and 68. These stages are arranged as a forward and backward stepping ring counter. The counter will step in a forward direction, i.e., a 1 state will progress, for example, successively through stages 62, 64, 66, 68; 62, 64, etc., and in a backward direction, i.e., a 1 state will progress, for example, successively through stages 62, 68, 66, 64; 62, 68, etc. Voltages existing at output terminals 70, 72, 74 and 76 of the stages 62, 64, 66, and 68 respectively are coupled by conventional OR-gate circuits 78, 80, 82 and 84 to output amplifiers 86, 88, 90 and 92. These amplifiers energize the windings 42 and 44 in accordance with the voltages existing at the ring counter output terminals.

Various forms of forward and backward ring counters for use in the arrangement of FIGURES 1 and 3 are known in the art. One such arrangement is described in Sheet No. 10002–A, Preliminary Data Sheet, Schokley Transistor Company, Division of Clevite Corporation, dated Oct. 20, 1959. Alternatively, the counter stages may comprise flip-flop circuits arranged as a shift register.

In operation, a 1 state will be established at a one of the output terminals 70, 72, 74 and 76 while a 0 state is established at the remainder of these terminals. The 1 state may conventionally be represented by a relatively positive DC potential and the 0 state by a relatively negative DC potetnial. After a 1 state has been established in the binary stage 62 of the ring counter, then a succession of pulses applied to forward stepping control means will cause the 1 state to step forward progressively through the stages of the counter and in the sequence 64, 66, 68, 62; 64, 66, etc., with each successive input pulse. Conversely, a succession of input pulses applied to backward stepping control means will cause the 1 state to progress backward through the stages in the sequence 68, 66, 64, 62; 68, 66, etc. The output of each binary stage is applied via the OR-gates to two amplifier stages and, after each successive input pulse, each of the windings will have relatively positive and relatively negative voltages applied thereto. The amplifiers 86, 88, 90 and 92 may, though not necessarily, comprise a two stage voltage amplifier. A succession of pulses at terminal 33 will therefore generate a sequence of motor control voltages in accordance with Table 1 and the rotor will rotate in a clockwise direction. Similarly, pulses at terminal 34 cause a corresponding counterclockwise rotation. The mechanically coupled wiper arm 38 will be driven by the rotor and a correction voltage applied to terminal 14 will effect base line correction. The arrangement thus operates as a feedback means or servo loop.

FIGURE 4 is a schematic diagram of a voltage to frequency transducer 10 which is adapted to provide output pulses at terminal 24 when the polarity of an input signal is negative and output pulses at terminal 28 when the polarity of an input signal is positive. The frequency of the pulses at each of these terminals is proportional to the amplitude of an input signal applied to terminal 11. Transducer 10 includes a Miller integrator circuit, means for discharging the capacitor of the Miller integrator circuit when the output of the Miller integrator attains a pre-established voltage level and means for shaping the output from the integrator.

The Miller integrator amplifier stage is indicated generally as 94. The conventional charging capacitor for the Miller circuit is indicated as 96 and the conventional charging resistance is designated 98. Various resistive impedances are shown for establishing the desired operating potentials for the circuit. Miller Integrator Circuits are will known in the art and are described in detail in "Pulse and Digital Techniques," Millman and Taub, McGraw-Hill Book Company, 1956.

In general, an input signal at terminal 11 will cause the capacitor 96 to charge positively or negatively in accordance with the polarity of the input signal. An amplified signal appears at an output terminal 99 of the Miller circuit. As the output signal attains a preselected level, a one of two discharge transistors indicated as 100, 102 is driven to conduction and the capacitor 96 will discharge through the emitter-collector path of the conductive transistor. Upon discharge, the emitter-collector path of the conductive discharge transistor returns to a relatively high-impedance state and the capacitor 96 again charges in accordance with the input voltage. The output voltage at terminal 99 is thereby sawtooth-shaped and, because of the Miller integrator circuit, has a frequency related to the input voltage with a high degree of linearity. When the input voltage amplitude is constant, the sawtooth output voltage will have a constant frequency. As the input amplitude varies, the frequency of the output voltage at terminal 99 will vary accordingly. The output voltage will also vary in accordance with the polarity of the input signal.

The transistors 100 and 102 are provided for discharging the capacitor 96 in accordance with the level and polarity of the output voltage. PNP transistor 100 will discharge the capacitor 96 for relatively positive input signals while NPN transistor 102 will discharge the capacitor 96 for relatively negative input signals. Circuit means for establishing the capacitor discharge level and for causing the transistor 102 to become conductive include a trigger circuit indicated generally as 104, a voltage divider coupled to output terminal 99 and having resistors 106, 108 and a potentiometer 110, and means including a diode 112 for coupling the trigger stage 104 to a base electrode of the transistor 102. The sawtooth output voltage is coupled from terminal 99 to stage 104 for initiating a trigger cycle via an arm on the potentiometer 110 and a diode 114. A collector electrode voltage of transistor 116 is thereby driven in a relatively positive direction and the resulting impulse is applied to a base electrode of discharge transistor 102. The discharge level can be selected by adjustment of potentiometer 110.

In a similar manner, the transistor 100 is driven to conduction by an output signal coupled from a potentiometer 120 of a voltage divider. This stage is adapted to trigger on an input signal having a relatively negative going excursion. A collector electrode voltage of a transistor 124 is thereby driven in a relatively negative direction and the resulting impulse is applied to a base electrode of discharge transistor 100 via a diode 125. The discharge level can be selected by adjustment of potentiometer 122.

In addition to driving the discharge transistor into conduction, the stages 104 and 118 trigger succeeding waveshaping stages. A negative going voltage waveform at a collector electrode of a transistor 126 is coupled to a monostable multivibrator stage 128 and a positive going voltage waveform at a collector electrode of a transistor 130 is coupled to a monostable multivibrator stage 132. These stages are conventional and generate positive and negative output pulses which are coupled by emitter follower stages to terminals 24 and 28 respectively. When positive pulses are desired at terminals 24 and 28, as indicated with respect to FIGURE 1, then the base of emitter follower amplifier 134 can be coupled to the collector of transistor 138. Differentials of the output pulses can be taken from terminals 140 and 142 when so desired.

A base line correction voltage from potentiometer 36 is combined with the input signal to the Miller integrator. The combination may be accomplished in various manners. One such arrangement shows the voltage applied to terminal 4 and then to the terminal 11 via a resistive impedance 150.

The described base line correction arrangement is adapted to be operative during the intervals intermediate the peaks. Accordingly, conventional slope detectors can be provided for detecting the initiation and termination of a peak component 20. An output from the slope detectors can thus be employed to disable the correction circuit during occurrence of a peak. One such arrangement may comprise a conventional circuit coupled intermediate the terminals 24, 28 and 33, 34 and which is adapted to be disabled by outputs from the slope detectors.

While I have illustrated and described a particular embodiment of my invention, it will be understood that various modifications may be made therein without departing from the spirit of the invention and the scope of the appended claims.

I claim:
1. A voltage to frequency transducer circuit arrangement comprising:
   a voltage to frequency transducer adapted for providing output signals indicative of the polarity of an input signal and having a frequency which varies in accordance with amplitude variations of the input signal,
   means for applying an input signal to said transducer, said input signal having information components and amplitude varying base line components thereof, and
   feedback means responsive to said output signals and arranged for reducing the amplitude variation of the base line component.

2. A voltage to frequency transducer circuit arrangement comprising:
   a voltage to frequency transducer arranged for providing a first output signal at a first terminal thereof indicative of an input signal of first polarity and having a frequency proportional to the amplitude of the input signal and a second output signal at a second terminal thereof indicative of an input signal of opposite polarity and having a frequency proportional to the amplitude of the input signal,
   means for applying an input signal to said transducer, said input signal having information components and amplitude varying base line components thereof,
   feed-back means responsive to said output signals for generating a base line correction voltage, and
   means for combining said correction signal with said input signal.

3. The transducer of claim 2 wherein said feedback means comprises a servo loop.

4. A voltage to frequency transducer circuit arrangement comprising:
   a voltage to frequency transducer arranged for providing alternatively at a first and a second output terminal thereof an output signal respectively indicative of a positively and negatively polarized input signal and varying in frequency in accordance with input signal amplitude,
   means for applying to said transducer an input signal having information components and base line components thereof,
   a motor driven variable voltage source for providing a correction voltage having an amplitude varying in accordance with motor rotation,
   said motor having excitation windings for rotating said motor in a clockwise or counterclockise direction in accordance with the polarity of motor winding excitation,
   means coupled to said transducer output terminals and to said windings for stepping the motor in a clockwise and counterclockwise direction when an output signal occurs respectively at said first and second output terminals, and
   means for combining said correction voltage with said input signal.

5. The comparator of claim 6 wherein said motor comprises a stepping motor adapted to step in angular increments.

6. A voltage to frequency transducer circuit arrangement comprising:
   a voltage to frequency transducer for providing an output signal which varies in frequency in accordance with the amplitude of an input signal alternatively at a first output terminal thereof when the input signal is positively polarized and at a second output terminal when the input signal is negatively polarized,
   means for applying to said transducer an input signal having information components and amplitude varying base line components thereof, adjustable circuit means adapted to be mechanically driven and coupled to said transducer for reducing the amplitude of the base line components, a stepping motor having field windings and a rotor mechanically coupled to said adjustable circuit means, a counter network, said counter network coupled to said field windings and adapted to excite the windings in a manner for causing the motor to rotate in angular increments in opposite directions in accordance with an input signal thereof, and means for coupling said transducer output signal to said counter network.

7. A voltage to frequency transducer circuit arrangement comprising:

a Miller integrator amplifier circuit arrangement, means for applying to said amplifier an input signal having information components and amplitude varying base line components thereof, said amplifier including a charging capacitor, circuit means for discharging said capacitor when the input signal attains pre-established amplitude levels of positive and negative polarity and for providing output pulses alternatively and respectively at first and second output terminals, a potentiometer having a mechanically adjustable wiper contact, means for applying a voltage to said potentiometer, means electrically coupling a voltage at said wiper arm to said transducer for combining with said input signal, a stepping motor having field windings and a rotor mechanically coupled to said wiper contact, a multistage ring counter adapted to step in a forward and backward direction when pulses are applied respectively to first and second input terminals thereof, circuit means coupled to said ring counter including a plurality of OR-gate circuits and amplifier circuits for establishing relatively positive and negative potentials at each of said field windings in accordance with the condition of said counter, and means for intercoupling said first and second transducer terminals respectively with said first and second counter terminals.

8. The transducer of claim 7 including means for inhibiting correction during occurrence of said input signal information components.

9. An electronic integrator arrangement comprising:

a voltage to frequency transducer adapted for providing output signals indicative of the polarity of an input signal and having a frequency which varies in accordance with amplitude variations of the input signal, means for applying an input signal to said transducer, said input signal having information base line components, electronic counter means having an input terminal and adapted to count and indicate a sum of pulses which are applied thereto during an interval of time, means for coupling said output signals to said counter input terminal, and feedback means responsive to said output signals and adapted for reducing the amplitude variation of the base line components.

References Cited

UNITED STATES PATENTS

| | | | |
|---|---|---|---|
| 2,977,518 | 3/1961 | Kafka et al. | 318—138 |
| 3,324,467 | 6/1967 | Crow et al. | 318—138 XR |
| 3,359,474 | 12/1967 | Welch et al. | 318—138 |

BENJAMIN DOBECK, Primary Examiner

U.S. Cl. X.R.

318—28, 30